United States Patent Office 3,847,902
Patented Nov. 12, 1974

3,847,902
PREPARATION OF CAPROLACTAM AND DICYCLOHEXYL KETONE
Alberto Santambrogio, Corsico, and Emilio Perrotti, San Donato Milanese, Italy, assignors to Snam Progetti S.p.A., San Donato Milanese, Italy
No Drawing. Continuation of abandoned application Ser. No. 159,539, July 2, 1971. This application Jan. 10, 1973, Ser. No. 322,481
Claims priority, application Italy, July 2, 1970, 26,875/70
Int. Cl. C07d 41/06
U.S. Cl. 260—239.3 A    3 Claims

ABSTRACT OF THE DISCLOSURE

A process is disclosed whereby caprolactam and dicyclohexyl ketone are prepared by pyrolyzing the mono-sodium salt of ε-cyclohexyl amidocaproic acid in the molten state to produce a distillate containing those end products.

---

This is a continuation of application Ser. No. 159,539, filed July 2, 1971, now abandoned.

The present invention relates to a process for obtaining valuable products from amidocarboxylic acid derivatives and products obtained from said process.

More particularly the present invention is directed to a process for obtaining valuable products from amidocarboxylic acid derivatives having the formula:

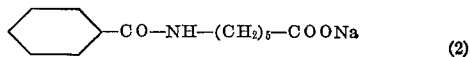

and the products obtained through such a process.

In the above formula R is a hydrocarbon radical; more particularly it can be a substituted or unsubstituted alkyl, cycloalkyl, aromatic radical having up to 10 carbon atoms. Examples of said radicals are: phenyl, tolyl, xylyl, cyclohexyl, linear or ramified alkyl also partially unsaturated; among the above-mentioned derivatives the ones having one or more hydrogen atom replaced by alcohol, ether, nitro, cyano, carboxy, carboxyalkylic functions and so on may be comprised. Furthermore in the above formula n represents an integer comprised between 2 and 15.

The process according to the present invention consists simply in preparing such an acid, subjecting it to pyrolysis and then separating the obtained products. In the example of the present invention the metal derivative is in the melted state, but it is also possible to carry out the reaction on the solid compound or as a solution or suspension. The pyrolysis temperature can be about as high as the melting point of the metal compound of one of the above-mentioned acids which is under treatment or higher.

In the second case the reaction is carried out on the melted product. The process according to the invention is extremely simple; it may be applied in a broad sense to any metal derivative of the acids of the formula (1) and makes it possible to obtain products having a very high industrial interest with high yields. It may be also applied to the synthesis of particular compounds as well as to the recovery of products in any operative cycle comprising the direct preparation or the preparation as a by-product of the derivative of one of the acids having the formula (1). The temperatures, as aforesaid, may vary over a wide range; in an indicative way, a temperature of 300–500° C. is sufficient.

The pressure is related to the nature of the product; it may vary over a wide range. It may be reduced to values lower than the atmospheric pressure when the removal of the end products from the reaction zone is sought; such a way of operating is advantageous in case of thermally unstable easily polymerizable products.

The more common salt to be subjected to pyrolysis is the one comprising an alkali metal preferably sodium; however no limitations are provided as to the nature of the usable metal. Also, while the invention will be illustrated in the particular case of sodium salt of the ε-cyclohexyl amidocaproic acid, which is an interesting case in that it gives caprolactam (an important product from the industrial point of view) and other interesting by-products such as dicyclohexylketone, the invention itself is not to be intended in any sense as restricted by said example which is illustrative of our invention.

The above-mentioned compound, i.e. the sodium salt of the epsilon-cyclohexyl amidocaproic acid, has the following formula:

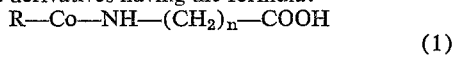 (2)

By pyrolyzing the above product at a temperature comprised between 400–440° C. under vacuum, a yellow-brown distillate was obtained corresponding to about 85–90% of the organic part contained in the sodium salt used and a residue mainly consisting of sodium carbonate with a small amount of pyrolytic carbon.

EXAMPLE 1.74 g. of sodium salt (2) placed in a test tube connected with a collecting trap for liquid, cooled by acetone and Dry-Ice, were gradually heated under vacuum up to 450° C. The pyrolysis of the product started at 340° C. with formation of a small amount of a liquid product which sharply increased at 440–450° C. In such a way 1.25 g. of distilled product was obtained together with 0.4 g. of a residue mainly consisting of sodium carbonate with a small amount of carbon. On the distilled product the analysis has been carried out by mass spectrometry to identify the different chromatographic peaks. The main products obtained are caprolactam, dicyclohexylketone besides other components in smaller amounts comprising cyclohexylcyanide (major impurities among the low boiling products) and traces of aromatic and unsaturated cyclic hydrocarbons. As far as the caprolactam, dicyclohexylketone and cyclohexylcyanide are concerned, the identification was carried out by comparison with pure compounds and a quantitative determination was carried out on the main product by chromatographic analysis.

On the basis of the tests it is possible to say that the caprolactam in the distillate is about 60–65% of the theoretical amount, while the yield of dicyclohexylketone is about 50% of the theory. The caprolactam, dicyclohexylketone, cyclohexylcyanide amount to about 70% of distillate by weight.

What is claimed is:

1. The method of preparing, as end products, caprolactam and dicyclohexyl ketone wherein an alkali metal salt of ε-cyclohexyl amidocaproic acid is pyrolyzed by heating to a temperature in the range of 300–500° C. and a distillate containing said end products is recovered.

2. The method of preparing caprolactam and dicyclohexyl ketone as claimed in claim 1, wherein the alkali metal is sodium.

3. The method of preparing caprolactam and dicyclohexyl ketone as claimed in claim 2, wherein the pyrolysis temperature is in the range 400–440° C.

References Cited
UNITED STATES PATENTS
3,575,964   4/1971   Hawkins _____ 260—239.3 A NATALIE TROUSOF, Primary Examiner R. T. BOND, Assistant Examiner U.S. Cl. X.R.
260—586 R, 464